United States Patent [19]

Convis et al.

[11] Patent Number: 4,555,700
[45] Date of Patent: Nov. 26, 1985

[54] INTERNAL IMAGE AND BIT ARRAY FOR DISPLAY AND PRINTING OF GRAPHICS

[75] Inventors: Danny B. Convis, Washington Grove; Donald T. Crehan, Gaithersburg, both of Md.; Charles J. Lovell, Austin, Tex.

[73] Assignee: International Business Machines Corp., Armonk, N.Y.

[21] Appl. No.: 493,677

[22] Filed: May 11, 1983

[51] Int. Cl.⁴ .............................................. G07G 3/00
[52] U.S. Cl. .................................. 340/721; 340/724; 340/747
[58] Field of Search ............... 340/722, 721, 753, 754, 340/747, 724; 178/30

[56] References Cited

U.S. PATENT DOCUMENTS 3,671,943 6/1972 Thompson et al. .................. 340/764
3,781,850 12/1973 Gicca et al. .......................... 340/747

OTHER PUBLICATIONS

*A Cell Organized Raster Display for Line Drawings*, Jordan et al.; Comm. of the ACM; vol. 17, No. 2; 2/74.

Primary Examiner—Marshall M. Curtis
Attorney, Agent, or Firm—C. Lamont Whitham; J. B. Kraft; John L. Jackson

[57] ABSTRACT

A word processing system is provided with separate data structures in system memory (4). One of these, the internal image array, stores data representative of alphanumeric data and low resolution graphic data in the form of alphanumeric character data and graphic character data. Another stores data representative of high resolution printed graphics in the form of a bit array. The data from the internal image array is applied to the display terminal of the word processing system to provide a representation of the graphic data with the alphanumeric data. The alphanumeric data only from the internal image array is merged with the high resolution graphic data in the bit array to produce the printer data stream for the printer of the word processing system.

4 Claims, 17 Drawing Figures

```
XXXXXXXX   ...X...X   .XX..XX.   .XX..XX.
XXXXXXXX   ..X...X.   X..XX..X   XXXXXXXX
XXXXXXXX   .X...X..   X..XX..X   XXXXXXXX
XXXXXXXX   X...X...   .XX..XX.   .XX..XX.
XXXXXXXX   ...X...X   .XX..XX.   .XX..XX.
XXXXXXXX   ..X...X.   X..XX..X   XXXXXXXX
XXXXXXXX   .X...X..   X..XX..X   XXXXXXXX
XXXXXXXX   X...X...   .XX..XX.   .XX..XX.
``` x = PEL IS ON
. = PEL IS OFF

```
........   ........   ........   ........
........   ........   ........   ........
XXXXXXXX   ...X...X   .XX..XX.   .XX..XX.
XXXXXXXX   ..X...X.   X..XX..X   XXXXXXXX
XXXXXXXX   .X...X..   X..XX..X   XXXXXXXX
XXXXXXXX   X...X...   .XX..XX.   .XX..XX.
XXXXXXXX   ...X...X   .XX..XX.   .XX..XX.
XXXXXXXX   ..X...X.   X..XX..X   XXXXXXXX
XXXXXXXX   .X...X..   X..XX..X   XXXXXXXX
XXXXXXXX   X...X...   .XX..XX.   .XX..XX.
........   ........   ........   ........
........   ........   ........   ........
........   ........   ........   ........
........   ........   ........   ........
```

```
XX XXXXXX   .......X   XXXXXXXX   XXXXXXXX   ........
.......X   .......X   .......X   ........   ........
.......X   .......X   .......X   ........   ........
.......X   .......X   .......X   ........   ........
.......X   .......X   .......X   ........   ........
.......X   .......X   .......X   ........   ........
.......X   .......X   .......X   ........   ........
.......X   .......X   .......X   ........   XXXXXXXX
.......X   .......X   .......X   ........   ........
.......X   .......X   .......X   ........   ........
.......X   .......X   .......X   ........   ........
.......X   .......X   .......X   ........   ........
.......X   .......X   .......X   ........   ........
.......X   .......X   .......X   ........   ........
.......X   .......X   .......X   ........   ........
.......X   .......X   .......X   ........   ........
```

· = PEL OFF
x = PEL ON
o = PEL ON BRIGHT

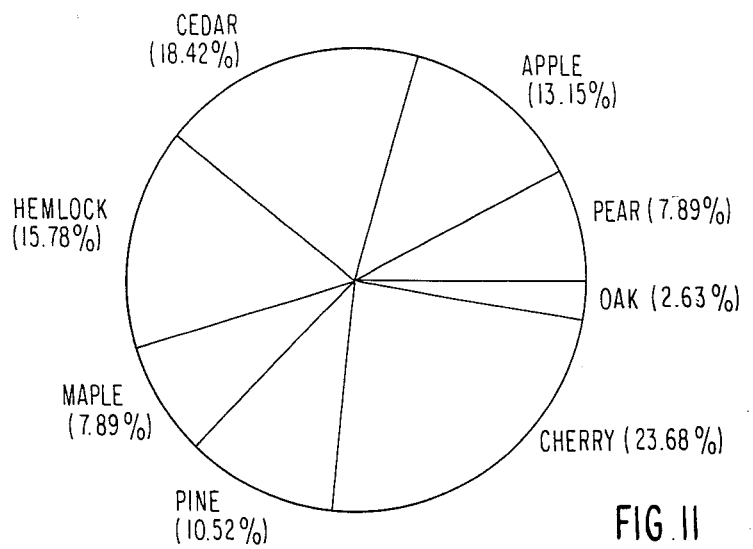
FIG. 11
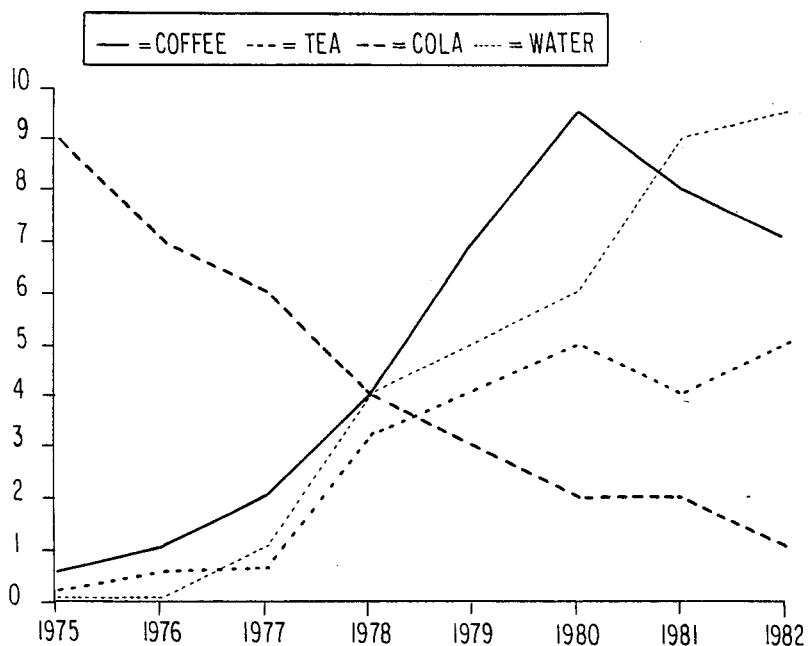
FIG. 12 BEVERAGE TRENDS

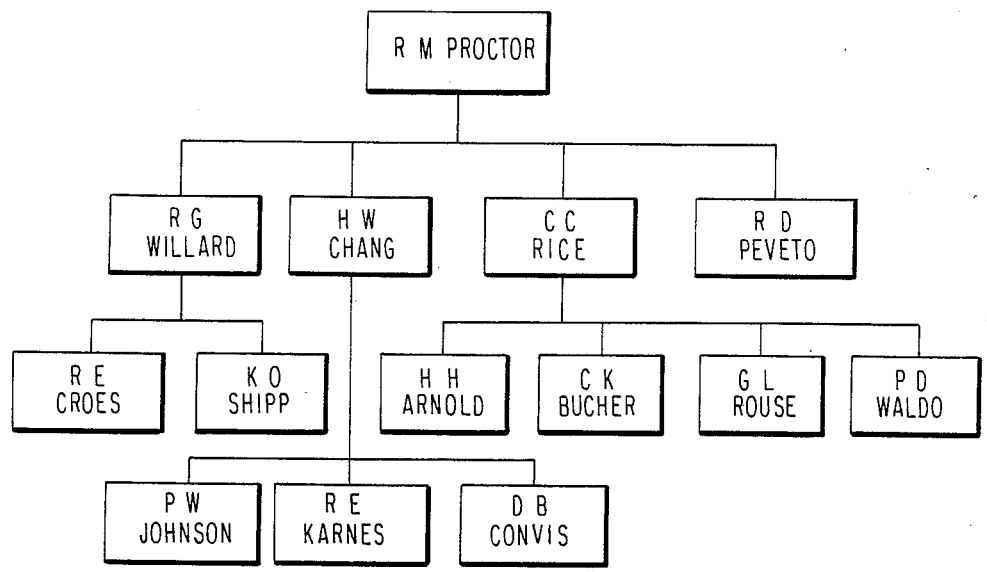
FIG. 15
FIG. 16
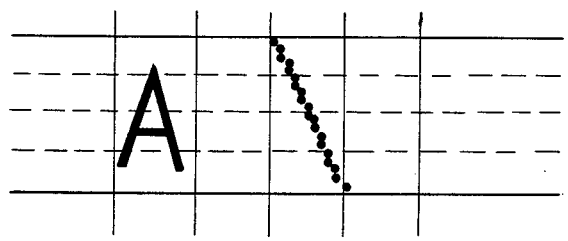

INTERNAL IMAGE AND BIT ARRAY FOR DISPLAY AND PRINTING OF GRAPHICS

RELATED APPLICATIONS

This application is related to the following concurrently filed applications which are assigned to a common assignee and are incorporated herein by reference:

application Ser. No. 06/493,578, filed May 11, 1983, by Jerold D. Dwire and Donald T. Crehan and entitled "Display of Graphics Using a Non-All Points Addressable Display".

application Ser. No. 06/493,402, filed May 11, 1983, by R. E. Karnes, R. A. McCaskill and K. D. Nguyen and entitled "Printing with a Data Stream Including Merged Graphic and Alphanumeric Data".

FIELD OF THE INVENTION

This invention generally relates to word processing systems, and more particularly to the provision in such systems of the data structures that contain the necessary and sufficient information of graphic images to display the graphic images on a character box display and print the graphic images on a printwheel printer.

BACKGROUND OF THE INVENTION

Word processing systems have evolved from relatively simple text processors which facilitated the manipulation of character strings to the sophisticated multitasking processors of today which are capable of such diverse applications as communications, calculations and data processing emulations. It is not uncommon, for example, to provide a word processing system with a calculation application to facilitate the preparation of financial statements or similar business documents. Moreover, it has become popular to expand the calculation application to include the generation of graphics data based on calculated or input numerical data. This is because it is often easier to interpret the numerical data when it is presented as a bar, pie or line graph, for example.

The problem arises, however, in the presentation of the graphics data. Generally, the visual display of graphics data on a CRT display has been accomplished with an All Points Addressable (APA) display. Word processing systems typically use a character box or non-APA display. The advantage of the character box display is that it requires much less memory than an APA display of even moderate resolution. The disadvantage in so far as the presentation of graphics data is concerned is the inability of the character box display to support the display of characters not defined by the character box.

Printing the graphics data is another problem because most business level word processing systems employ letter quality printers of the type wherein a fully formed character is imprinted on the paper by a single stroke. Typical of such letter quality printers are printwheel printers. The printwheels on these printers usually have 96 petals, each having a single character. In the past, printing of graphics data has usually been accomplished with a dot matrix printer or a plotter. While the dot matrix printer and the plotter do an excellent job of printing graphics data, neither is an acceptable substitute for the printing of alphanumeric characters. The user of a word processing system has therefore been faced with the requirement of purchasing two printers in order to obtain quality printing of both alphanumeric characters and graphics data. However, the logistics of using two different printers, especially when the same page is to be imprinted by both, is not at all satisfactory.

SUMMARY OF THE INVENTION

It is therefore an object of the present invention to provide a word processing system using a non-APA display and a letter quality printer with the ability to both display and print graphics data.

It is another object of the invention to provide a high quality printed output and an adequate quality display of bar, pie and line charts in a system confined to a display and a printwheel printer that were intended only to output a full character cell at a time.

It is a further object of the invention to provide the data structures that contain the necessary and sufficient information of graphic images such as bar, pie or line charts to (1) display the chart on a character box display and (2) print it on a printwheel printer.

The foregoing and other objects of the invention are accomplished by providing in the display character generator Read Only Storage (ROS), five groups of characters which can be used to generate a display of bar, pie and line charts, X-Y coordinate axes and free-form charts. On the printwheel, thirteen characters have been defined to cover these five groups of characters in ROS. The invention provides an internal image and bit array apparatus to contain the data structures necessary and sufficient to both display and print the graphics data. These data structures are (1) output by the process that converts numeric data values into image data and (2) input to the display process and the print process. These are the central mechanisms that make graphics on a character box device possible.

BRIEF DESCRIPTION OF THE DRAWINGS

The foregoing and other objects, aspects and advantages of the invention will be better understood from the following detailed description with reference to the accompanying drawings, in which:

FIG. 2 is an illustration of the bar chart characters in the display character generator ROS;

FIG. 3 is an illustration of the pie chart characters in the display character generator ROS;

FIG. 4 is an illustration of the line chart characters in the display character generator ROS;

FIG. 5 is an illustration of the X-Y coordinate axes characters in the display character generator ROS;

FIG. 11 shows a sample pie chart printed using the invention;

FIG. 12 shows a sample line chart printed using the invention;

FIG. 15 shows a sample free-form chart printed using the invention; and

FIG. 16 shows how alphanumeric and bit data are combined at print time.

DETAILED DESCRIPTION OF THE INVENTION

Figure 1:
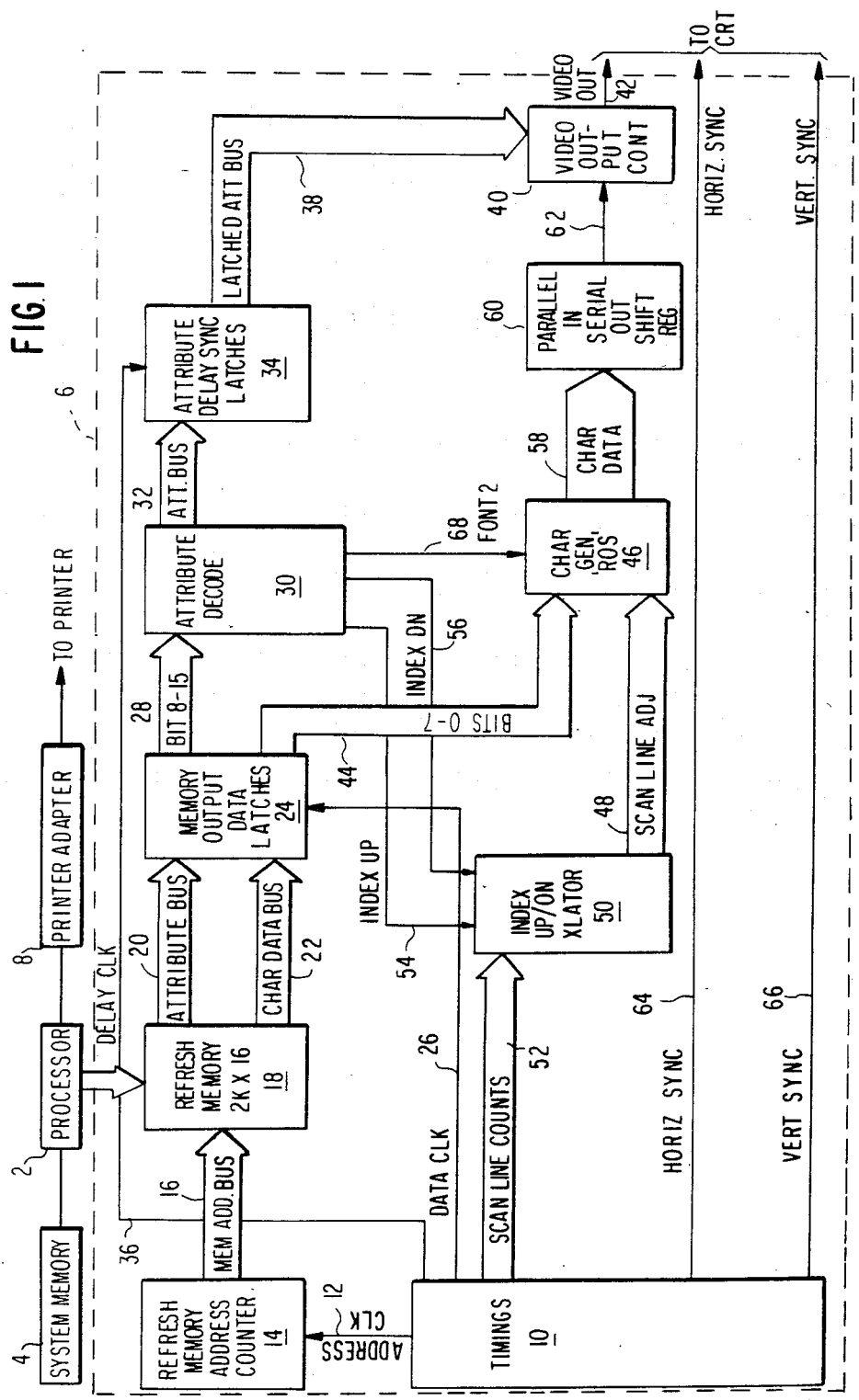
FIG. 1 is a block diagram of a word processing system in which the present invention is embodied.

Referring now to the drawings, and more particularly to FIG. 1, there is shown a block diagram of a typical implementation of a word processor in which the present invention is embodied. The system includes a processor 2, a system memory 4, a display adaptor 6, and a printer adaptor 8. The system memory 4 contains the bit array and the internal image array which are described in more detail hereinafter. Only those connections between processor 2, system memory 4, display adaptor 6 and the printer adaptor 8 are shown as needed for purposes of explanation of the invention, all other interconnections therebetween being well understood by those skilled in the art.

In the display adaptor 6, the timings block 10 provides various clocking signals for the word processor display function. The address clock signal on line 12 is input to refresh memory address counter 14 whose output appears on memory address bus 16. The address on bus 16 is input to the refresh memory 18. Attribute bus 20, as well as character data bus 22, are two outputs from refresh memory 18. The data on both buses 20 and 22 are latched into memory output data latches 24. Another clock signal from the timings block 10 is the data clock on line 26 which is input to data latches 24 for controlling input thereto. Eight bits on bus 28 are output from latches 24 to attribute decoder 30. Once decoded, attribute data is output on bus 32 and is input to attribute delay synchronization latches 34 under control of delay clock signals on line 36. The output of output control 40 on line 42 is the video input to the CRT display monitor (not shown).

The other eight bits of character data are output from memory output data latches 24 along bus 44 to the character generator ROS 46. The character generator ROS 46 also receives scan line adjustment data on bus 48 from index up or down translator 50 and input Font 2 on line 68 from attribute decoder 30. The translator 50 receives the scan line count on bus 52 from the timings block 10 and is controlled by signals from attribute decoder 30 on lines 54 and 56 to index up or down in order to provide superscript and subscript functions. The character data output on bus 58 from the character generator ROS 46 is read into a parallel in, serial out shift register 60. The serial character data strings are read out of shift register 60 on line 62 to the video output control 40. The timings block 10 also provides horizontal sync and vertical sync signals on lines 64 and 66 to the display CRT.

In order to understand the invention, one must first understand the constraints of the character box (non-APA) display and printer devices to which the apparatus according to the invention is tailored. Each character box on the display is 16 pels high and 8 pels wide. The display character generator ROS contains a character font wherein each character is constrained to this character box. Each character box on the display is represented by a two byte character-attribute pair. In other words, the first byte of the two byte pair defines the character address in ROS, and the second byte specifies an attribute of the displayed character. The bits of the attribute byte are defined as follows beginning with the most significant bit and continuing to the least significant bit:

Line End
* Half Index Up
* Half Index Down
Reverse Video
Underscore
Cursor
* Font2 (there are two fonts in the ROS of 256 symbols each)
* Bright The attribute bits marked with asterisk (*) are used in the apparatus according to the invention. An analogous two byte character-function pair is used to represent a character box on the printer. The printwheel has 96 petals which is sufficient to support the alphanumeric and special characters required for most applications plus a few additional special characters which may be added in a custom application. The present invention is such a custom application. The printer which is used in a preferred embodiment of the invention has a left-to-right escapement capability of 1/240 of an inch and a top-to-bottom indexing capability of 1/96 of an inch, although printers with coarser escapement and indexing can be used to good effect with the invention.

The five groups of characters in the character generator ROS which have been defined to support the display of graphics data according to the invention are shown in FIGS. 2 through 6. In FIG. 2, the character box for bar characters is broken into top and bottom halves, each 8 pels by 8 pels. Each of these halves can be one of four shades or be blank. This yields the following matrix of shade possibilities:

| 1 | 0 | 2 | 3 | 4 | 0 | UPPER-HALF |
|---|---|---|---|---|---|---|
| 1 | 1 | 1 | 1 | 1 | 0 | LOWER-HALF |
| 2 | 0 | 1 | 3 | 4 | 2 | UPPER-HALF |
| 2 | 2 | 2 | 2 | 2 | 0 | LOWER-HALF |
| 3 | 0 | 1 | 2 | 4 | 3 | UPPER-HALF |
| 3 | 3 | 3 | 3 | 3 | 0 | LOWER-HALF |
| 4 | 0 | 1 | 2 | 3 | 4 | UPPER-HALF |
| 4 | 4 | 4 | 4 | 4 | 0 | LOWER-HALF |
| 0 |   |   |   |   |   | UPPER-HALF |
| 0 |   |   |   |   |   | LOWER-HALF |

0 = SHADE 0 or blank
1 = SHADE 1
2 = SHADE 2
3 = SHADE 3
4 = SHADE 4

The four shades in the top or bottom of the character box are shown in FIG. 2. In addition, a set of four characters positioned in the middle of the character box (i.e. pel rows 5 to 13) are defined for horizontal bars that are half a line thick.

Figure 3:
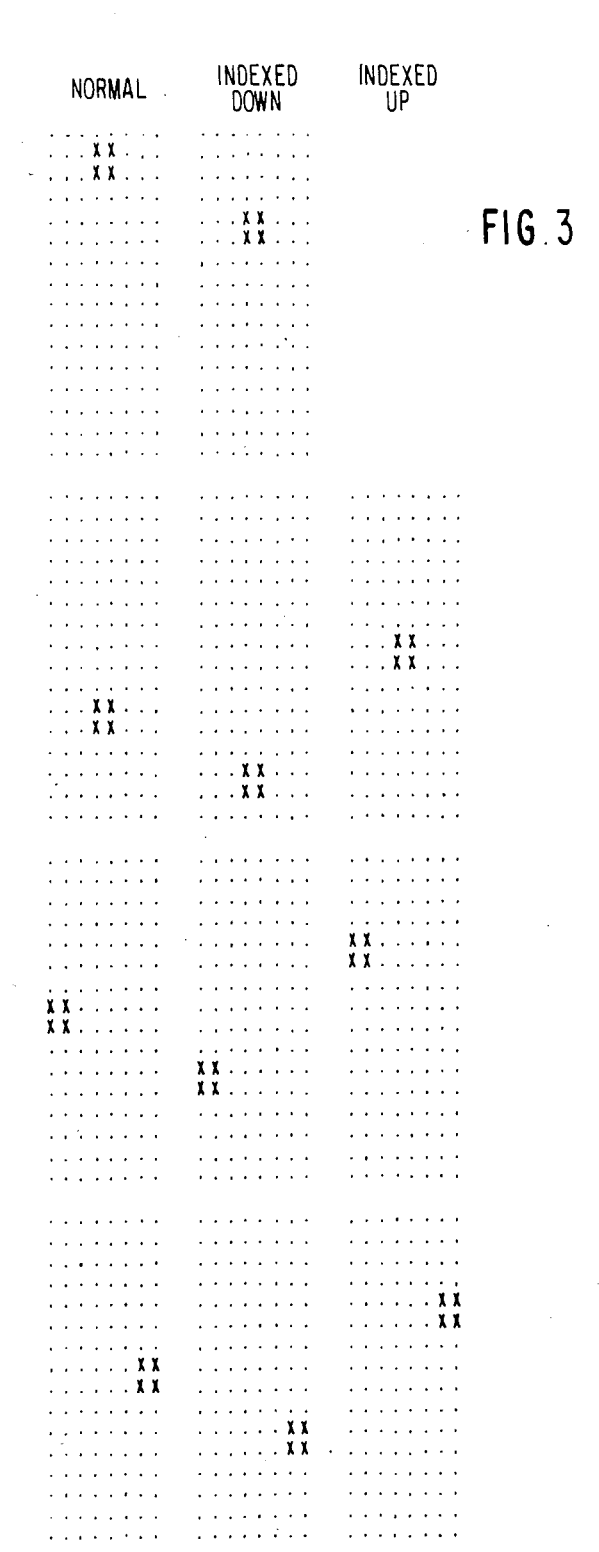

There are four characters defined in the display character generator ROS used to represent pie charts on the display. There are dots of 2 pels high by 2 pels wide positioned at different locations within the character box. These together with the attributes index up and index down provide a total of eleven effective dot characters as shown in FIG. 3 to outline the rim and spokes of the pie. The reason that there are not twelve effective dot characters is that the twelfth character is either redundant (overlaps another character) or is not allowed (falls outside the character box). The latter case is illustrated in FIG. 3.

Figure 4:
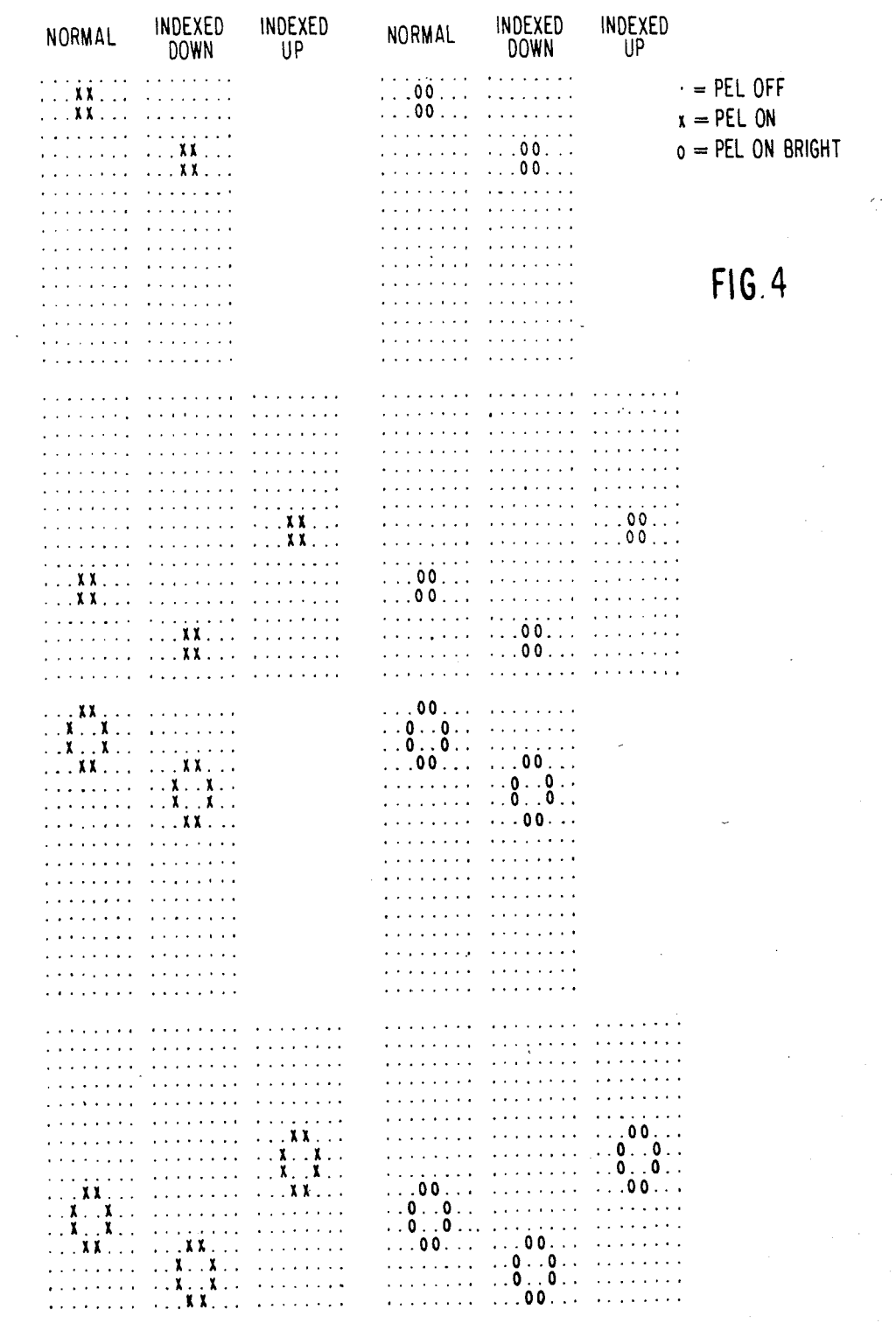

There are basically four characters defined in the display character generator ROS used to represent line charts on the display. These together with the attributes index up, index down and bright provide a total of twenty effective characters (five for each of the four line types) used to give a dot outline representation of lines on the display. These are shown in FIG. 4.

Figure 6:
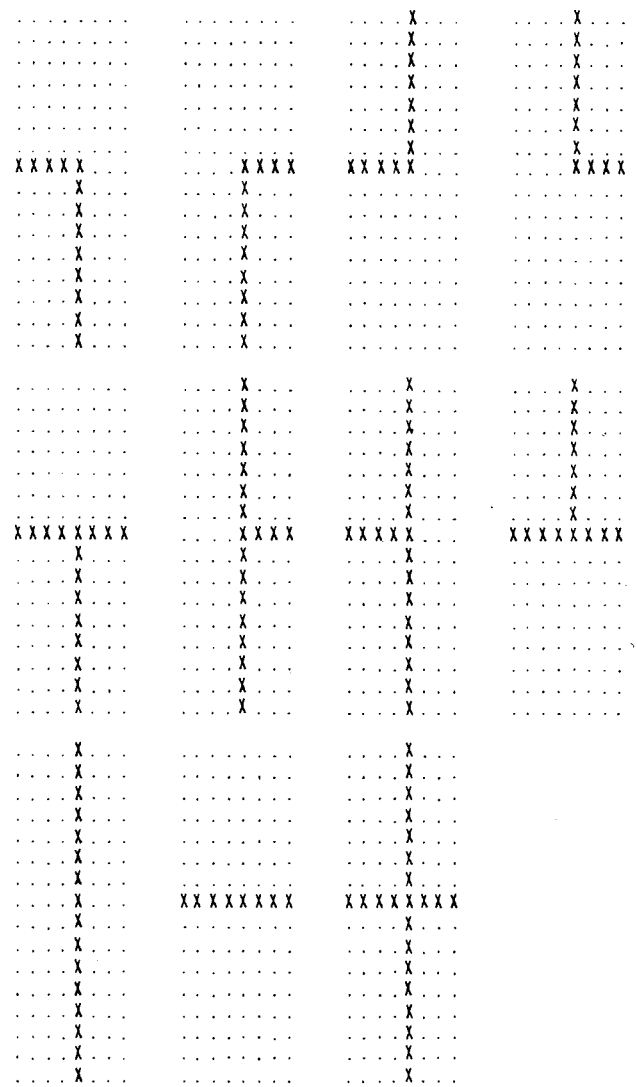
FIG. 6 is an illustration of the free-form characters in the display character generator ROS.

There are five characters in the display character generator ROS that are used for displaying X—Y coordinate axes. These are shown in FIG. 5. These same characters in addition to ten other characters in the display character generator ROS are used to display free-form charts such as organization charts. These additional ten characters are shown in FIG. 6.

Figure 7:
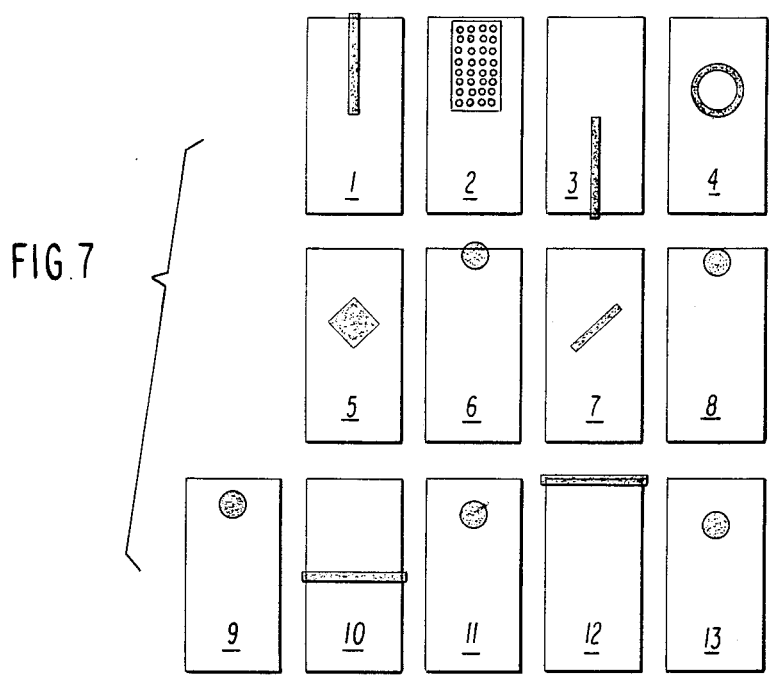
FIG. 7 is an illustration of the thirteen graphics printwheel characters.

The thirteen characters on the printwheel that have been defined to cover these five groups of characters in ROS are shown in FIG. 7. Bar chart symbols are covered by petals, 2, 4, 5, and 7. Axes and free-form symbols are covered by petals 1, 3, 10, and 12. Pie and line charts are covered by the five dots on petals 6, 8, 9, 11, and 13.

Figure 8A:
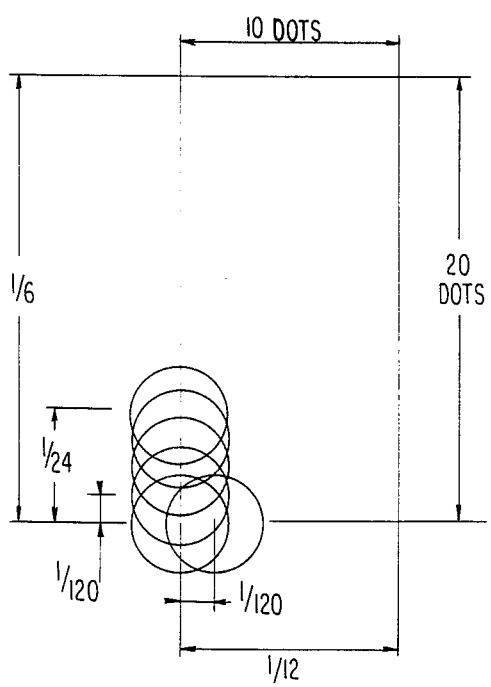
FIGS. 8A and 8B illustrate the procedure for printing pie and line charts using the five dots on petals 6, 8, 9, 11, and 13 of the printwheel as illustrated in FIG. 7.
Figure 8B:
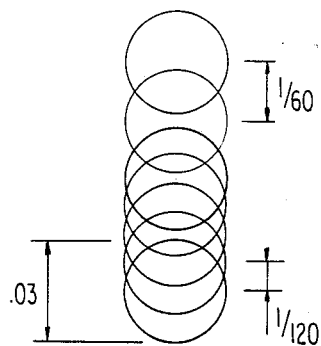

The five dots used for pie and line charts work as follows. As shown in FIG. 8A, each character box is broken into a matrix of dots 20 high and 10 wide. This is 1/6 of an inch high and 1/12 of an inch wide, and 120 dot per inch resolution. With the printer having a left-to-right escapement capability of 1/240 of an inch and a top-to-bottom indexing capability of 1/96 of an inch, a resolution of 1/120 of an inch horizontally is obtained by escaping the carrier by two of the 1/240 units, and a resolution of 1/120 of an inch vertically is obtained by defining five dots on the printwheel at 1/120 of an inch intervals. Thus, all together the five dots cover a height of 1/24 of an inch. By making four passes at each character line, the full 1/6 of an inch height of the character line can be spanned. In this way, these five dots provide an effective dot matrix capability of 120 dots per inch. FIG. 8B illustrates how the speed of the printer can be doubled when printing pie or line charts. By adding two more dots to the printwheel, one located 1/60 of an inch beyond the last of the five main dots and the second on 1/60 of an inch beyond that, there are now five dots all at 1/60 inch spacing. These are the first, third and fifth dots plus the added two. This provides an ability to print at 60 dots per inch and span the 1/6 inch height of a character line in two passes instead of four. This ability to span a character line in two passes doubles the speed of the printing process.

Figure 9:
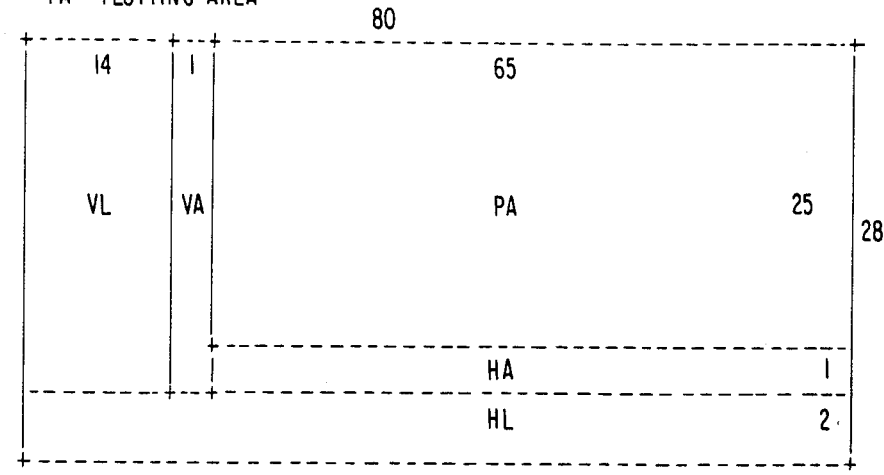
FIG. 9 shows the internal image data structure.
Figure 10:
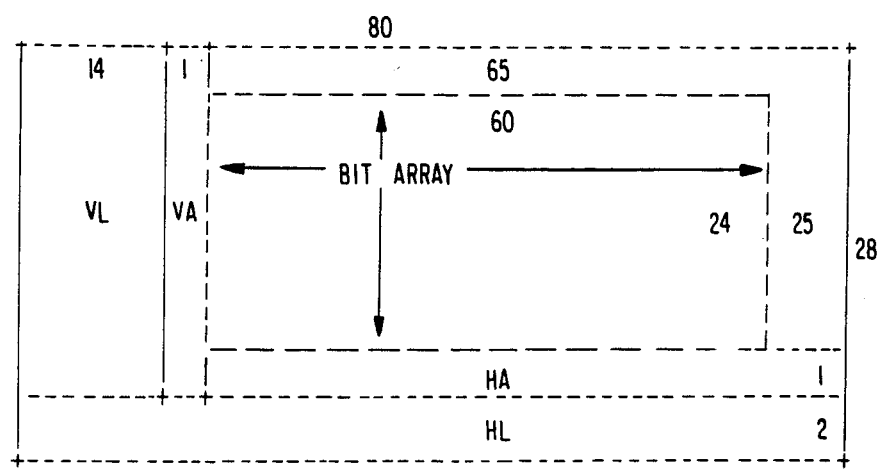
FIG. 10 shows the positional relationship between the internal image data structure and the bit array with the bit array being positioned over the plotting area of the internal image.

With these display and printer hardware constraints in mind, the internal image and bit array apparatus can now be described. This apparatus consists of two data structures that are closely linked. The first is the internal image structure. It is shown in FIG. 9 and is a three dimensional matrix. It is 28 character boxes high and 80 character boxes wide, where each box contains two bytes. These two bytes correspond to the fact that each box in the character box display requires a character-attribute byte pair. The second data structure is the bit array data structure shown in FIG. 10 and is also a three dimensional matrix. It is 24 character boxes high and 60 character boxes wide, where each character box contains 25 bytes. The 25 bytes contain the 200 dots of the 20×10 print resolution dot matrix of the corresponding character position in the internal image data structure. FIG. 10 shows the positional relationship between the two data structures, the bit array being positioned over the plotting area of the internal image. In the case of pie charts, the rim and spokes of the pie are "written" into the bit array by turning on bits in that array that correspond to those objects. However, the alphanumeric labels of each slice are "written" into the corresponding cells of the internal image. When it is necessary to display the pie chart, the bit array is scanned and a set of "best dot" glyphs are selected and put in the internal image so as to form a "dot outline" of the pie as described in the above noted application Ser. No. 493,578 entitled "Display of Graphics Using a Non-All Points Addressable Display". The display viewer sees its alphanumeric labels and the dot outline of the pie together on the screen. However, when it is time to print the chart on the printer, the bit array, which contains a high print resolution (1/120 dot/inch) bit map, is combined with the internal image's alphanumeric content to print a high quality product. A sample pie chart printed by this method is illustrated in FIG. 11.

A "best dot" selection process is used to map the print bit map in the bit array into the internal image character box display for both pie and line charts. It should be understood that the character box display can not possibly show the chart with a resolution comparable to that of the printer. In the character box environment, there are a number of restrictions by virtue of the character box hardware. Specifically, the character box in the display is 16 pels high and 8 pels wide while in the printer, it is effectively 20 pels high and 10 pels wide. In the display, there are four characters which when indexed up and down provide eleven possible positions within the character box to outline the rim and spokes of a pie chart, and there are four characters which when brightened and/or indexed up or down provide twenty glyphs to outline the segments of lines in a line chart. For both the pie chart and the line chart, the circle and straight line segments are drawn into a print resolution bit map that corresponds to the central plotting area of the chart. This print resolution bit map is used when printing so that the image is printed in high resolution. The bit map is 60 character box cells wide (600 pels) and 24 character box cells high (480 pels). Each 20×10 cell of that plotting area corresponds to a character box on the display and is examined to determine which of the eleven pie characters or which of the five line characters is the "best dot" to represent the fragment of circle or line passing through that 20×10 area of the bit map. In the case of the pie chart, eleven zones (each 20×10 in size) are defined, and a bit mask is defined for each of the eleven zones. Then the cell containing the fragment is logically ANDed with each of the eleven masks in a priority order. The central zone is first, the zones immediately above and below it are next, and so on. The first logical AND of the cell with a mask that produces a non-zero result indicates that the circle or line fragment in the cell is intersecting that zone. Then that one of the eleven glyphs that corresponds to that zone is placed in the internal image array as the "best dot" to represent that fragment. The line chart is handled similarly, there being five zones and five masks since there are five glyphs effectively for each of the four line types. A more detailed description of this process is contained in application Ser. No. 493,578 entitled "Display of Graphs Using a Non-All Points Addressable Display".

Line charts are done in a manner similar to the pie chart. The line segments of each of four line types (solid, dotted, dashed, and double-dot) are written into the bit array by turning on points in that array. The vertical and horizontal axes and labels (which are essentially alphanumeric) are written into the internal image.

When it is necessary to display the line chart, the bit array is scanned and a set of "best dot" glyphs are selected and put in the internal image so as to form a "dot outline" of the lines. The display viewer sees its alphanumeric labels and axes and the dot outline of the lines together on the screen. However, when it is time to print the chart on the printer, the bit array is combined with the internal image's alphanumeric content to print a high quality product. A sample line chart printed according to the invention is illustrated in FIG. 12.

Figure 13:
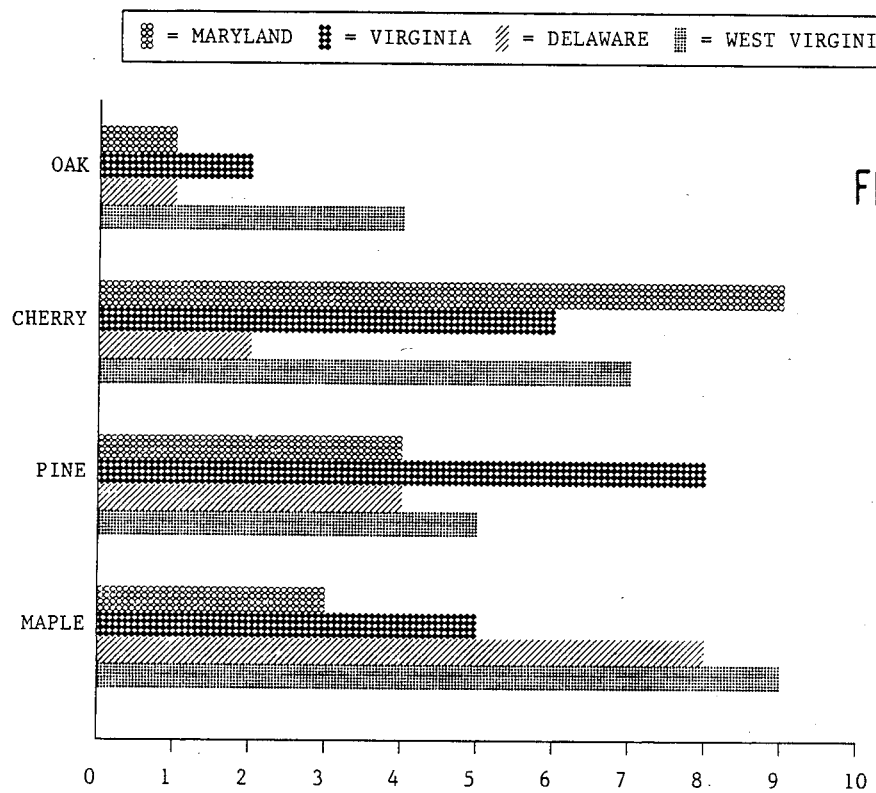
FIGS. 13 and 14 show samples of two different types of bar charts printed using the invention.
Figure 14:
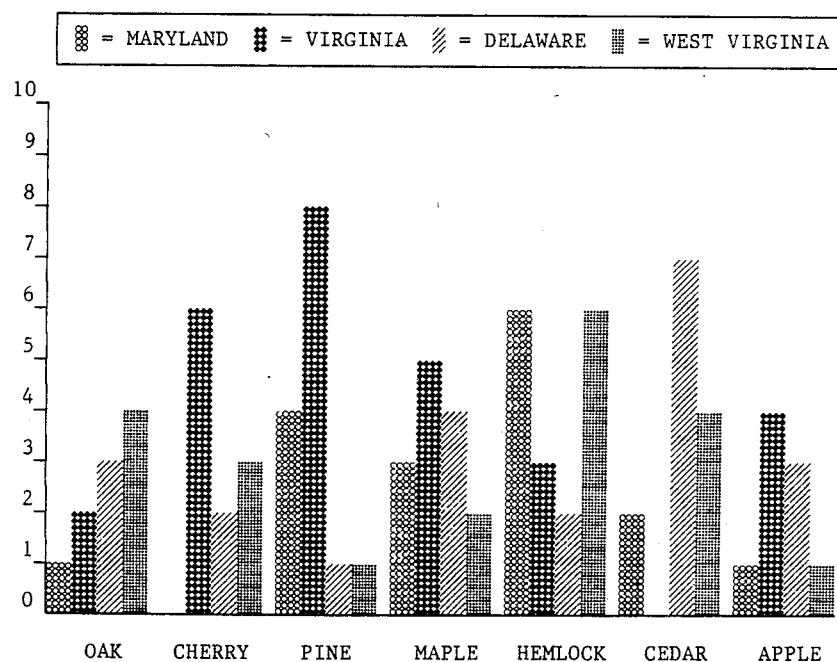

Bar charts are somewhat different in that no part of the chart is recorded in the bit array. The bar glyphs themselves as well as the axes and labels are all recorded in the internal image and this alone is used for both display and printing. In this case the display is not a dot outline of the chart but is as high quality as the printed bar chart. Samples of bar charts printed according to the invention are shown in FIGS. 13 and 14, and a sample of a free-form chart printed according to the invention is shown in FIG. 15.

The process by which these elements are brought together to print a chart can be visualized with reference to FIG. 16. This figure shows a piece of a typical print line of a pie or line chart. In the example illustrated, there is the requirement to print both alphanumeric data and high resolution bit data. Specifically, FIG. 16 may be considered a fragment of the rim of a pie chart. The alphanumeric data is in the internal image array and the bit data is in the bit array. Recall from the previous discussion and FIG. 8A that this type of line will be printed in four passes, each corresponding to one fourth the height of the character line. On the first pass, no alphanumeric data will print; the printer carriage will escape to the position of the dots in that top one fourth line and make five impacts at the approximately 1/120" escapements corresponding to the bits turned on in that cell in the bit array. At the end of the print line the paper is indexed one fourth line. The same process will occur again on the second and third passes. On the fourth pass, the carriage will now print the alphanumeric character "A" in the standard position it always prints and "A" (on the base line) and then go on to print five more dots and so on. In this way, the alphanumeric data from the internal image and the bit data from the bit array are transferred to the printer in an interleaved stream of print commands to print these one fourth print lines.

The bar chart is done in an analogous way except that only two half-line passes are made since the bar shade glyphs are one half a line tall and one half a character wide. Both the alphanumeric and bar chart glyph data are contained in the internal image array.

The display process is very straight forward since both the alphanumeric glyphs and the best dot glyphs (including the index up, index down, bright, etc. attributes) are all collected together in the internal image array. It is only necessary to move the contents of this array from system memory 4 to display adapter refresh memory 18 from where it will be output to the display screen.

The two data structures of the apparatus according to the invention provide a solution to the problem of developing an adequate display image and a high quality print image of graphics on the restricted character box hardware. This is important because graphics support on a word processor is increasingly becoming a requirement in order to sell in today's competitive office market. The key challenge of character box graphics is to present high quality printed output and adequate quality display of bar, pie and line charts while confined to a display and printwheel printer that were intended only to output a full character cell at a time. The invention avoids the need for more expensive all points addressable displays and printer devices.

We claim:

1. In a word processing system having an interactive display terminal and a printer, both said display terminal and said printer being character box devices, the improvement comprising apparatus for displaying alphanumeric and graphic images on said display terminal by character generation and for printing high resolution graphic images on said printer, said apparatus comprising:

first storage means for storing data representative of alphanumeric data and low resolution graphic data in the form of alphanumeric character data and graphic character data, respectively;

second storage means for storing data representative of high resolution printed graphics in the form of a bit array;

means for applying said data representative of said alphanumeric data from said first storage means and data from said second storage means to said printer; and means for applying said data representative of said alphanumeric data and said graphic data from said first storage means to said display terminal.

2. The apparatus according to claim 1 further comprising:

means for converting said data from said second storage means representative of high resolution graphics to graphic character box data; and means for applying said converted character box data to said first storage means.

3. The apparatus according to claim 1 wherein for the display of bar graphs, said first storage means stores high resolution graphics data and no data is stored in said second storage means, said means for applying data to said printer then applying both alphanumeric character data and graphic character data from said first storage means to said printer.

4. The apparatus according to claim 1 wherein said printer has a printwheel having a plurality of petals, a carrier on which said printwheel is mounted for rotational and horizontal movement, a platen, and means for escaping said carrier horizontally and indexing said platen vertically relative to said carrier, said apparatus further comprising five graphics characters on individual ones of aid petals, each of said characters being located in different predetermined vertical positions in the character box and being addressable with horizontal escapement and vertical indexing data to emulate a dot matrix printer by making multiple passes for each printing line.

* * * * *

UNITED STATES PATENT AND TRADEMARK OFFICE
CERTIFICATE OF CORRECTION

PATENT NO. : 4,555,700

DATED : Nov. 26, 1985

INVENTOR(S) : D. B. Convis et al

It is certified that error appears in the above—identified patent and that said Letters Patent is hereby corrected as shown below:

```
Column 1, line 9, "application" should read --Application--.
Column 1, line 13, "application" should read --Application--.
Column 8, line 57, "aid" should read --said--.
```

Signed and Sealed this

Third Day of February, 1987

Attest:

DONALD J. QUIGG

*Attesting Officer*   *Commissioner of Patents and Trademarks*